(12) United States Patent
Lou

(10) Patent No.: US 12,467,951 B2
(45) Date of Patent: Nov. 11, 2025

(54) PROBE DEVICE

(71) Applicant: TECAT TECHNOLOGIES (SUZHOU) LIMITED, Suzhou (CN)

(72) Inventor: Choon Leong Lou, Singapore (SG)

(73) Assignee: TECAT TECHNOLOGIES (SUZHOU) LIMITED, Suzhou (CN)

( * ) Notice: Subject to any disclaimer, the term of this patent is extended or adjusted under 35 U.S.C. 154(b) by 140 days.

(21) Appl. No.: 18/188,936

(22) Filed: Mar. 23, 2023

(65) Prior Publication Data
US 2023/0341439 A1    Oct. 26, 2023

Related U.S. Application Data

(60) Provisional application No. 63/333,723, filed on Apr. 22, 2022.

(51) Int. Cl.
*G01R 1/073* (2006.01)
*G01R 1/067* (2006.01)

(52) U.S. Cl.
CPC ..... *G01R 1/07307* (2013.01); *G01R 1/06772* (2013.01); *G01R 1/07321* (2013.01)

(58) Field of Classification Search
CPC ............ G01R 1/06772; G01R 1/07307; G01R 1/07321
See application file for complete search history.

(56) References Cited

U.S. PATENT DOCUMENTS

| | | | |
|---|---|---|---|
| 6,965,244 B2 | 11/2005 | Miller | |
| 2005/0142697 A1* | 6/2005 | Sato | G01R 31/2889 438/128 |
| 2008/0054918 A1* | 3/2008 | Lin | G01R 1/06772 324/756.03 |
| 2013/0021053 A1* | 1/2013 | Ku | G01R 1/067 324/756.03 |
| 2021/0048451 A1* | 2/2021 | Yang | G01R 1/06722 |
| 2021/0302470 A1* | 9/2021 | Moreira | G01R 31/2834 |
| 2022/0113334 A1* | 4/2022 | Tsai | G01R 1/07342 |

* cited by examiner

*Primary Examiner* — Judy Nguyen
*Assistant Examiner* — Adam S Clarke
(74) *Attorney, Agent, or Firm* — MUNCY, GEISSLER, OLDS & LOWE, P.C.

(57) ABSTRACT

The present disclosure provides a probe device. The probe device includes a first probe structure and a second probe structure. The first probe structure includes: a first body, a first substrate and a plurality of first probes. The first substrate is disposed on the first body. The first probes electrically connects to the first substrate and protrudes from a surface of the first substrate. The second probe structure includes: a second body, a second substrate and a plurality of second probes. The second body has a plurality of through holes. The second probes electrically connects to the second substrate and protrudes from a surface of the second body through the through holes. The length of the first probe is different from the length of the second probes.

9 Claims, 11 Drawing Sheets

PROBE DEVICE

CROSS REFERENCE TO RELATED APPLICATION

This application claims priority of U.S. provisional application No. 63/333,723 filed on Apr. 22, 2022, which is incorporated by reference in its entirety.

TECHNICAL FIELD

The present disclosure relates to probe devices and, more particularly, to a probe device capable of simultaneously measuring high-frequency signals and digital signals.

DISCUSSION OF THE BACKGROUND

In the prior art, various integrated circuit chips need to undergo electrical testing during the process of manufacturing. High-frequency signal testing on an object under test may be performed by a probe device having probes with a shorter length, and digital signal testing on the object under test may be performed by a probe device having probes with a longer length. However, to perform both high-frequency signal testing and digital signal testing on the object under test, a probe structure having probes of only one length fails to meet the above testing requirement.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

An embodiment of the present disclosure provides a probe device including a first probe structure and a second probe structure. The first probe structure includes a first body, a first substrate and a plurality of first probes. The first substrate is disposed on the first body. The plurality of first probes are electrically connected to the first substrate and protrude from a surface of the first substrate. The second probe structure includes a second body, a second substrate and a plurality of second probes. The second body has a plurality of through holes. The second substrate is disposed on the second body. The plurality of second probes are electrically connected to the second substrate and protrude from a surface of the second body via the through holes. A length of the plurality of first probes is different from a length of the plurality of second probes.

An embodiment of the present disclosure provides a probe device including a first probe structure and a second probe structure. The first probe structure includes a first body, a first substrate and a plurality of first probes. The first substrate is disposed on the first body. The plurality of first probes are disposed on the first substrate to correspond to a layout of a plurality of first contacts of an object under test, and are configured to test high-frequency signals. The second probe structure includes a second body, a second substrate and a plurality of second probes. The second substrate is disposed on the second body. The plurality of second probes are disposed on the second substrate via the second body to correspond to a layout of a plurality of second contacts of the object under test, and are configured to test digital signals.

The technical features and advantages of the present disclosure are comprehensively provided in the description above, so as to enable a better understanding of the present disclosure from details given in the description below. Additional technical features and advantages of the subject matter of the claims of the present disclosure are provided in the description below. A person skilled in the art of the present disclosure should understand that it would be easy to implement objects same as those of the present disclosure by modifying or designing other structures or processes on the basis of the concept and specific embodiments disclosed in the description below. Moreover, a person skilled in the art should understand that such equivalent arrangements are within the spirit and scope of the present disclosure as defined by the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1A:
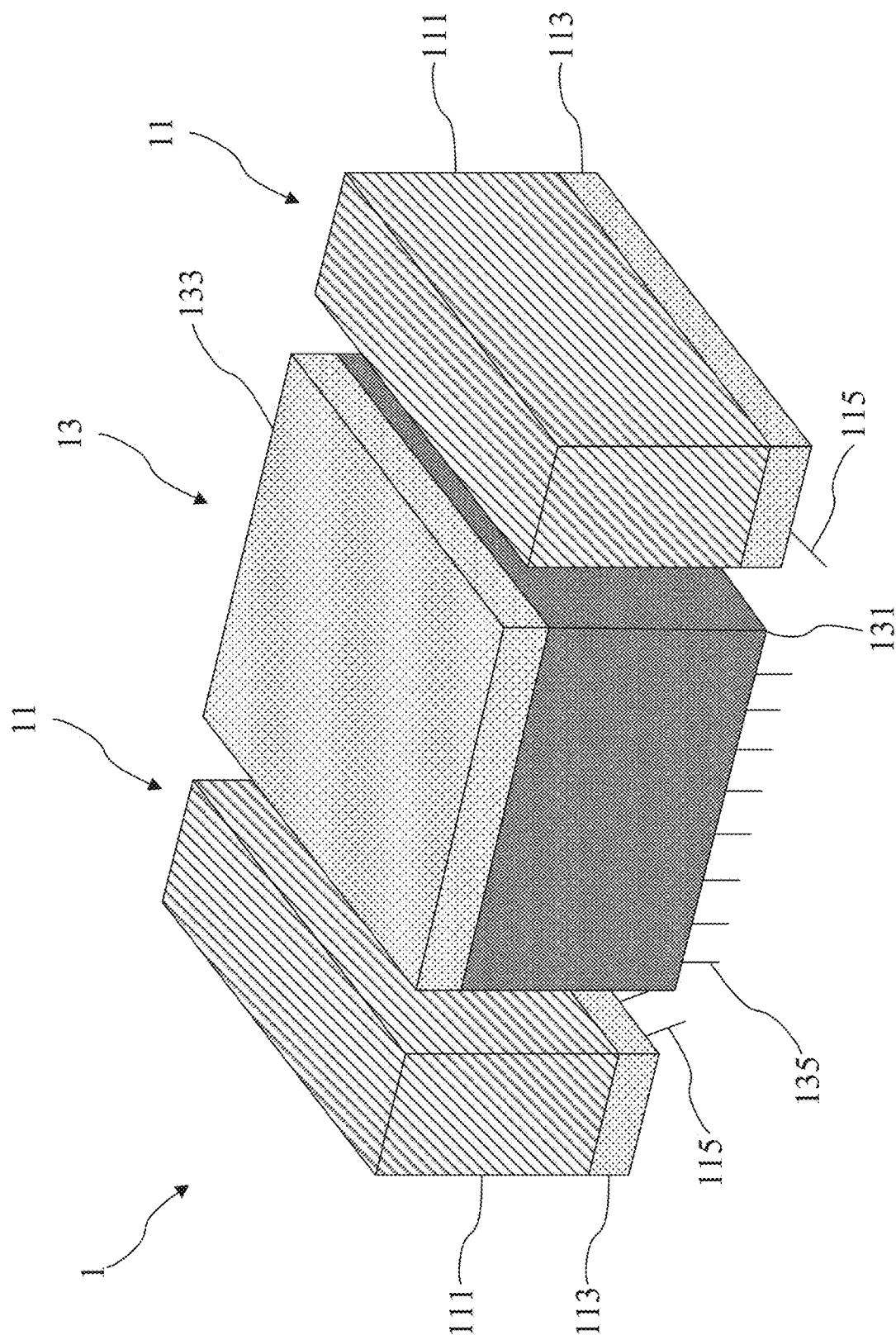
FIG. 1A is a perspective view of a probe device according to some embodiments of the present disclosure.

The description of the present disclosure below is accompanied by drawings to illustrate embodiments of the present disclosure. However, it should be noted that the present disclosure is not limited to such embodiments. Moreover, the embodiments below can be appropriately integrated into other embodiments.

The terms "embodiment," "an embodiment," "exemplary embodiment," "other embodiment" and "another embodiment" mean that the embodiments described in the present disclosure can include specific features, structures or characteristics; however, it should be noted that not every embodiment needs to include such specific features, structures or characteristics. In addition, repeated use of the expression "in the embodiment" or "of the embodiment" does not necessarily refer to the same embodiment, although it may.

To fully understand the present disclosure, steps and structures are described in detail below. It should be obvious that implementation of the present disclosure does not limit specific details generally known to persons skilled in the art. Further, generally known structures and steps are not described in detail, so as to prevent unnecessary limitation to the present disclosure. Preferred embodiments of the present disclosure are described in detail below. However, apart from the detailed description, the present disclosure can also be extensively applied in other embodiments. The scope of the present disclosure is not limited to the contents given in the detailed description, but is to be defined in accordance with the appended claims.

It should be understood that the disclosure below provides various different embodiments or implementation examples for implementing different features of the present disclosure. Specific embodiments or implementation examples of components and arrangements are set forth below to simplify the present disclosure. It should be noted that such details are exemplary and are not to be intended to be restrictive. For example, a size of an element is not limited to a disclosed range or value, but can depend on an expected property of a manufacturing condition and/or device. Moreover, in the description below, a first feature described as formed "on" or "above" a second feature may include embodiments in which the first feature and the second feature are formed in a direct contact manner, and may also include embodiments in which an additional feature is formed between the first feature and the second feature in a way that the first feature and the second feature may not be in direct contact. For simplicity and clarity, various features may be depicted according to different scales. In the accompanying drawings, some layers or features are omitted for the sake of simplicity.

Moreover, for better illustration, terms of relative spatial relations such as "beneath," "below," "lower," "above" and "upper" may be used to describe a relation of one element or feature relative to another element or feature. Such terms of relative spatial relation are intended to cover different orientations of the element during use or operation in addition to the orientation depicted in the drawings. An apparatus may be orientated otherwise (rotated 90 degrees or having another orientation) and the descriptive terms of the relative spatial relations used in the literature may also be similarly and correspondingly interpreted.

A probe device according to an embodiment of the present disclosure includes two probe structures. The first probe structure includes shorter probes, and the second probe structure includes longer probes. With the design of the different structures, the probes of the first probe structure and the probes of the second probe structure may be used to measure the same object under test. Accordingly, the probe device of the present disclose is capable of simultaneously coming into contact with different contacts of the object under test and simultaneously testing high-frequency signals and digital signals. Details of the structures above are described in the embodiments below.

Figure 1B:
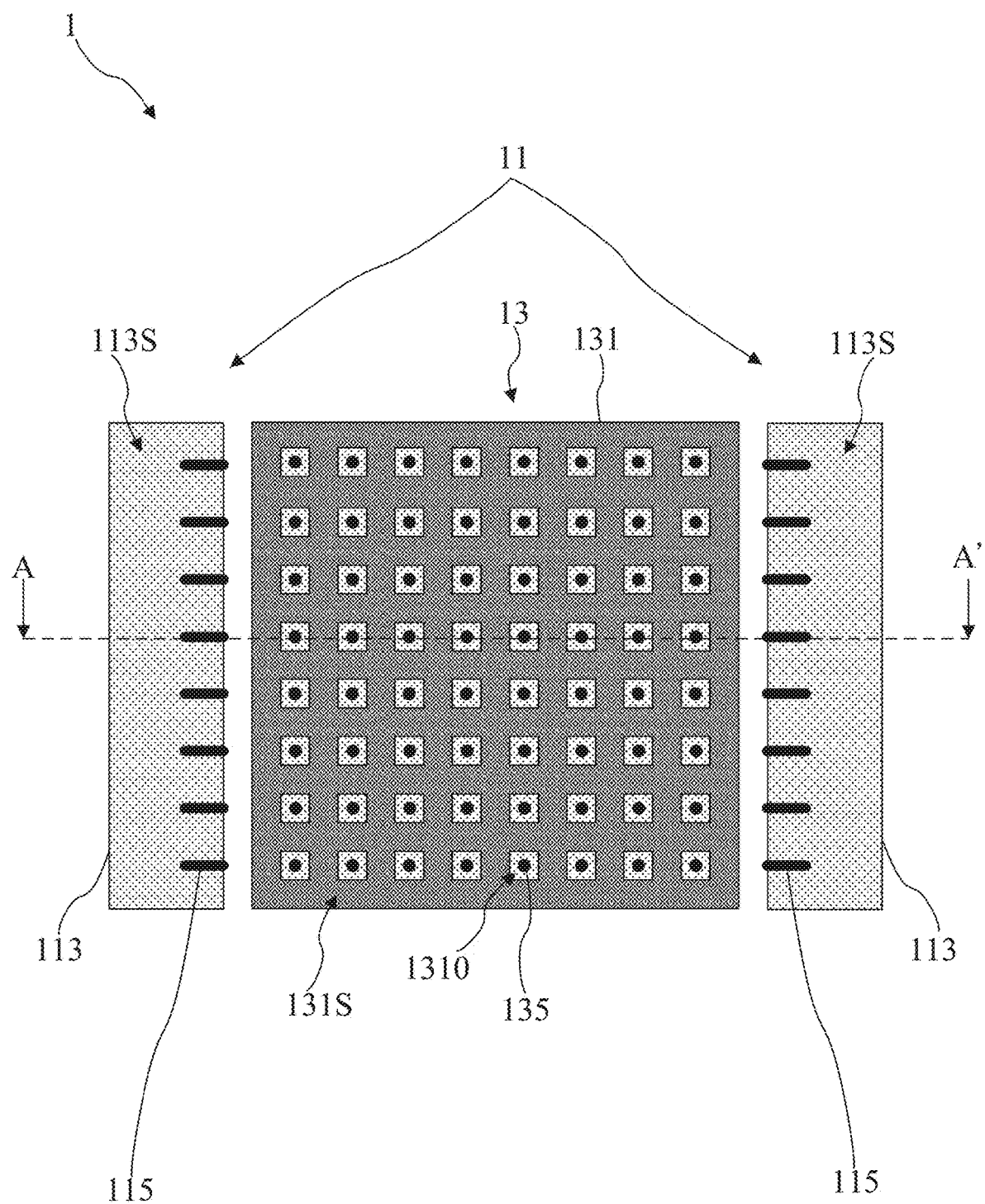
FIG. 1B is a bottom view of a probe device according to some embodiments of the present disclosure.
Figure 1C:
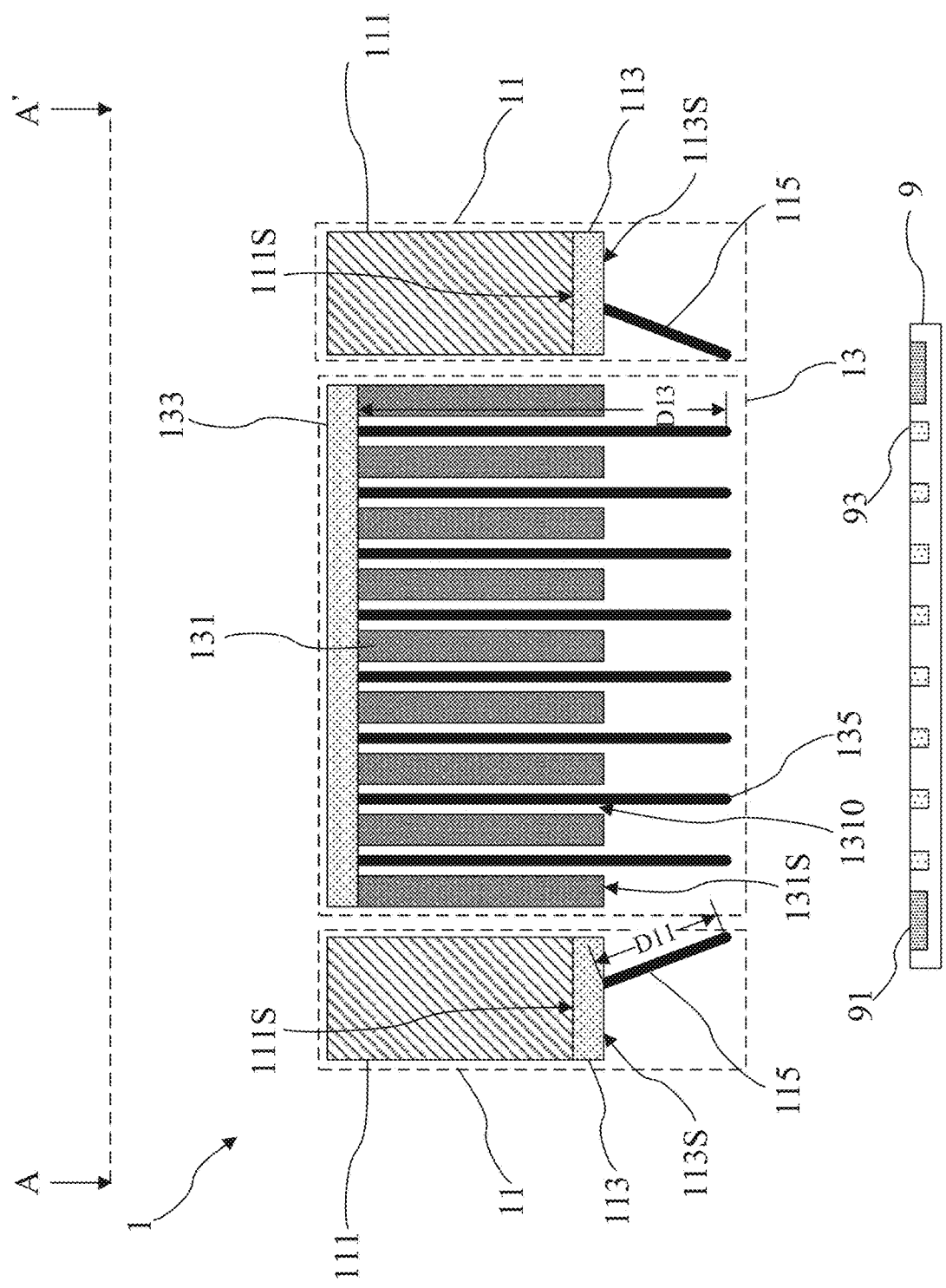
FIG. 1C is a cross-sectional view of a probe device according to some embodiments of the present disclosure.
Figure 1D:
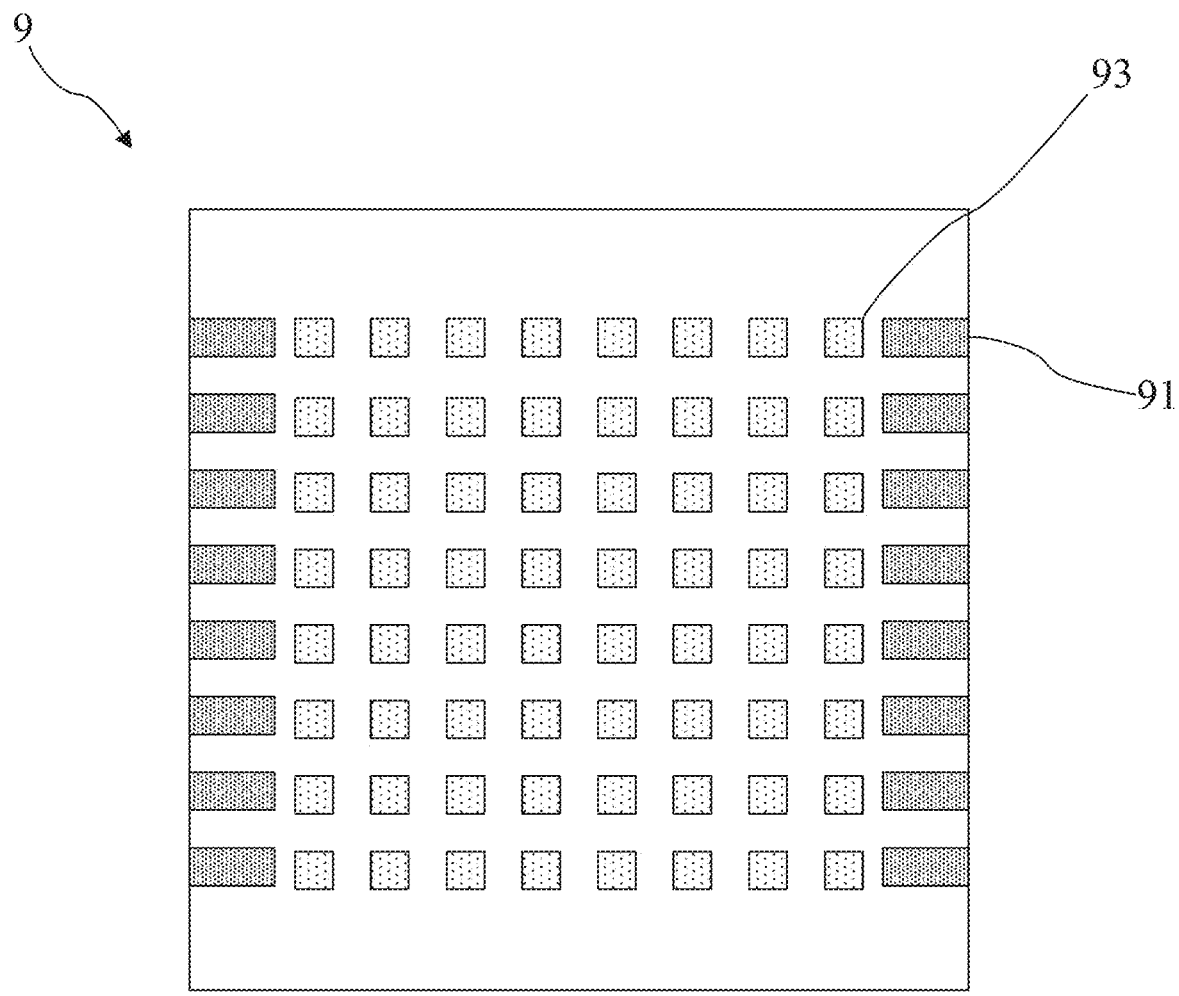
FIG. 1D is a schematic diagram of an object under test corresponding to a probe device according to some embodiments of the present disclosure.

Refer to FIGS. 1A to 1D. FIG. 1A shows a perspective view of a probe device 1 according to some embodiments of the present disclosure. FIG. 1B shows a bottom view of the probe device 1 according to some embodiments of the present disclosure. FIG. 1C shows a cross-sectional view of the probe device 1 according to some embodiments of the present disclosure. FIG. 1D shows a schematic diagram of an object 9 under test corresponding to the probe device 1 according to some embodiments of the present disclosure. The probe device 1 includes a first probe structure 11 and a second probe structure 13. The first probe structure 11 includes a first body 111, a first substrate 113 and a plurality of first probes 115. The second probe structure 13 includes a second body 131, a second substrate 133 and a plurality of second probes 135.

In some embodiments, the first substrate 113 is disposed on the first body 111, and the plurality of first probes 115 are electrically connected to the first substrate 113 and protrude outward from a surface 113S of the first substrate 113. More specifically, the first body 111 has a surface 111S facing the object 9 under test, and the first substrate 113 is disposed on the surface 111S of the first body 111. The first probes 115 protrude outward from the surface 113S of the first substrate 113 and are configured to contact with a plurality of first contacts 91 of the object 9 under test.

In some embodiments, the second substrate 133 is disposed on the second body 131, and the plurality of second probes 135 are electrically connected to the second substrate 133 and protrude outward from a surface 131S of the second body 131. More specifically, the second body 131 has a plurality of through holes 1310 and a surface 131S facing the object 9 under test, and the second substrate 133 is disposed on a surface opposite to the surface 131S of the second body 131. The second probes 135 pass through the second body 131 from the second substrate 133 via the through holes 1310, protrude outward from the surface 131S of the second body 131, and are configured to contact with a plurality of second contacts 93 of the object 9 under test.

In some embodiments, a length D11 of the plurality of first probes 115 is different from a length D13 of the plurality of second probes 135. For example, the first probes 115 with a shorter length are suitable for testing high-frequency signals, and the second probes 135 with a longer length are suitable for testing digital signals.

It should be noted that, in some drawings of the above embodiments, for better understanding of these drawings, only part of the first probes 115, part of the second probes 135, part of the through holes 1310, part of the first contacts 91 and the second contacts 93 of the object 9 under test are denoted, and this is not to be construed as interpretation limitations to the elements. Based on the drawings and the description of the present disclosure, a person skilled in the art should be able to understand the configuration of the plurality of the first probes 115 on the first probe structure 11, the configuration of the plurality of second probes 135 on the second probe structure 13, and the configurations of the plurality of first contacts 91 and the plurality of second contacts 93 on the object 9 under test.

Figure 2A:
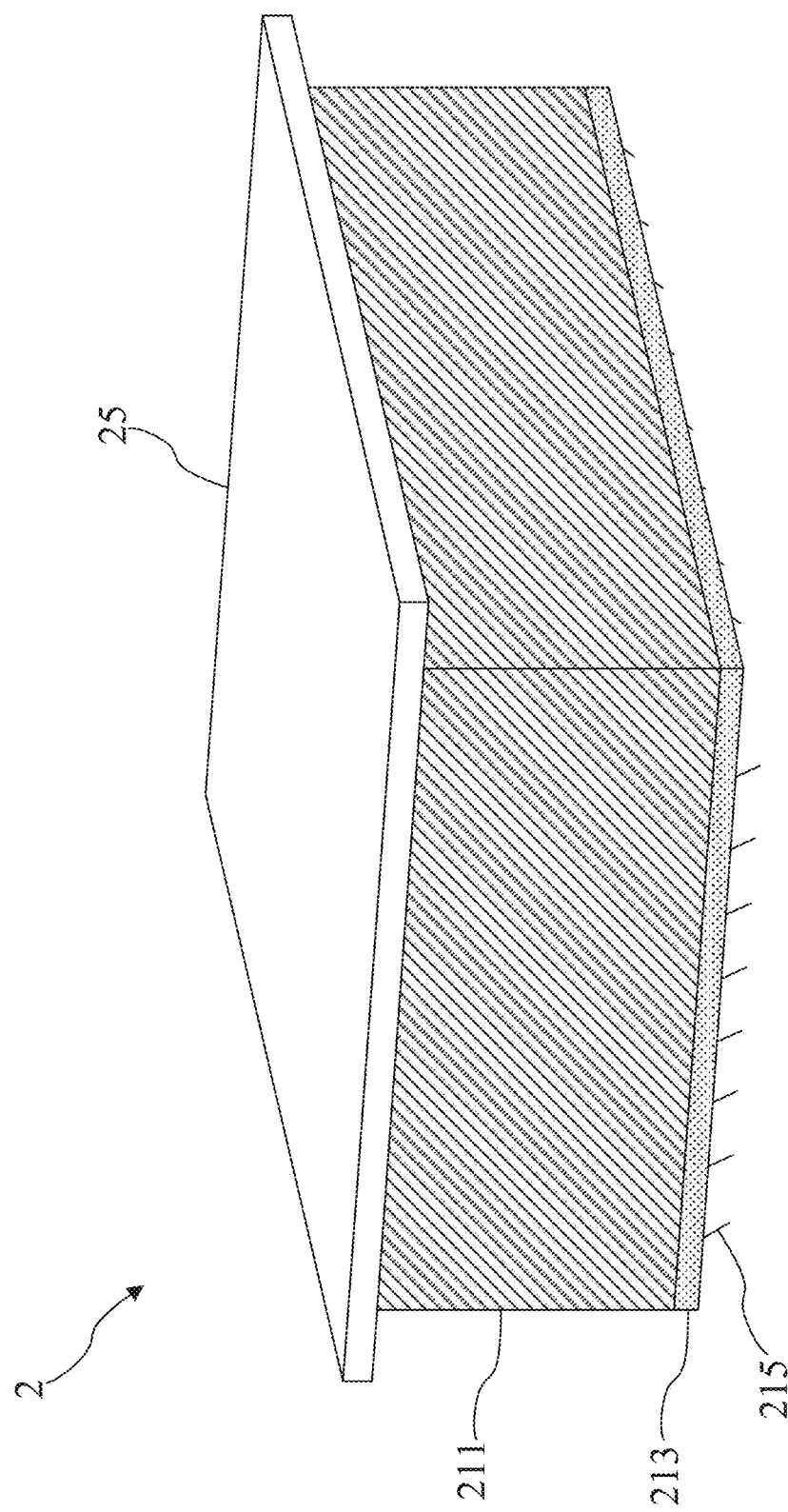
FIG. 2A to FIG. 2C are perspective views of a probe device according to some embodiments of the present disclosure.
Figure 2B:
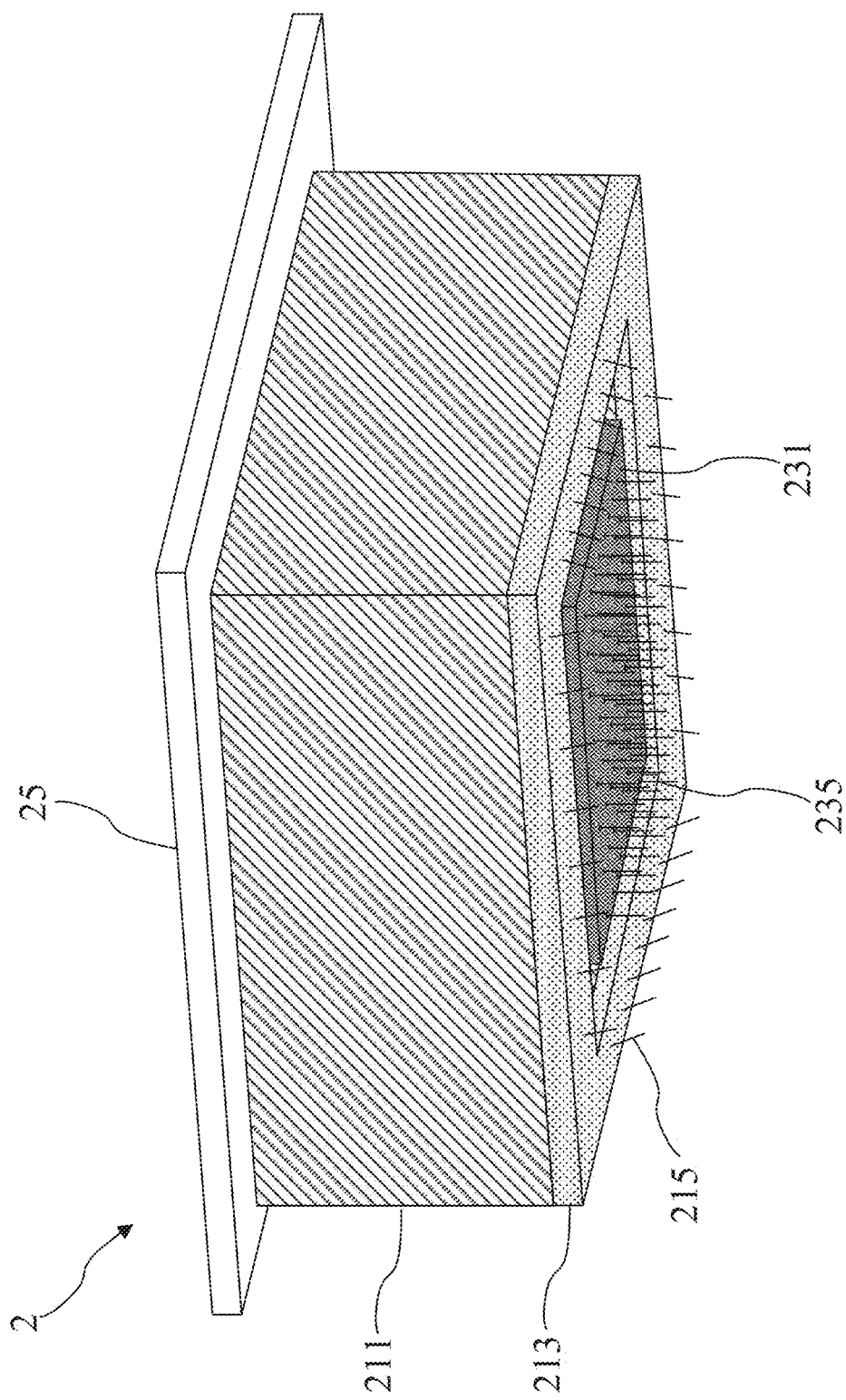
Figure 2C:
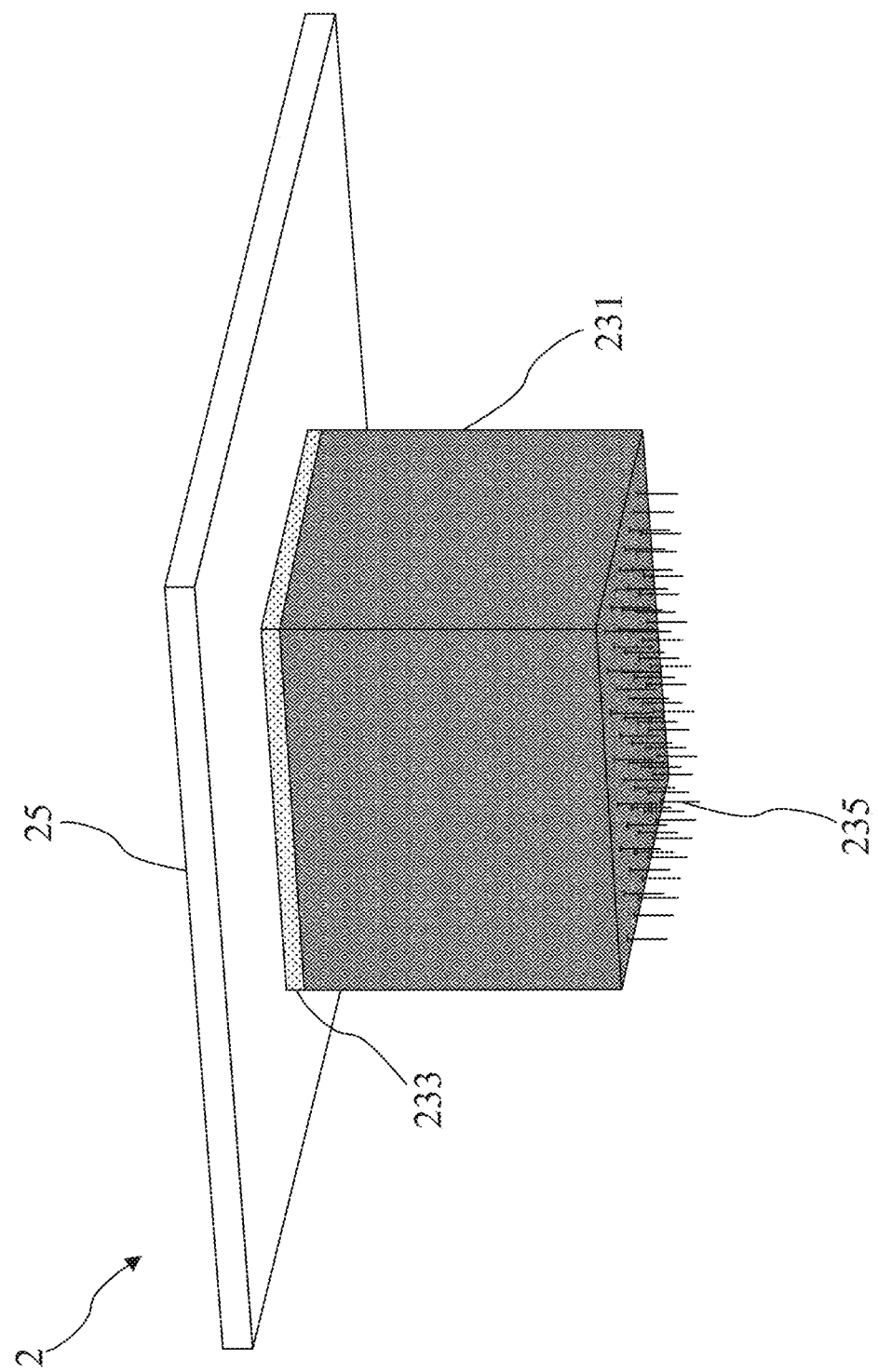
Figure 2D:
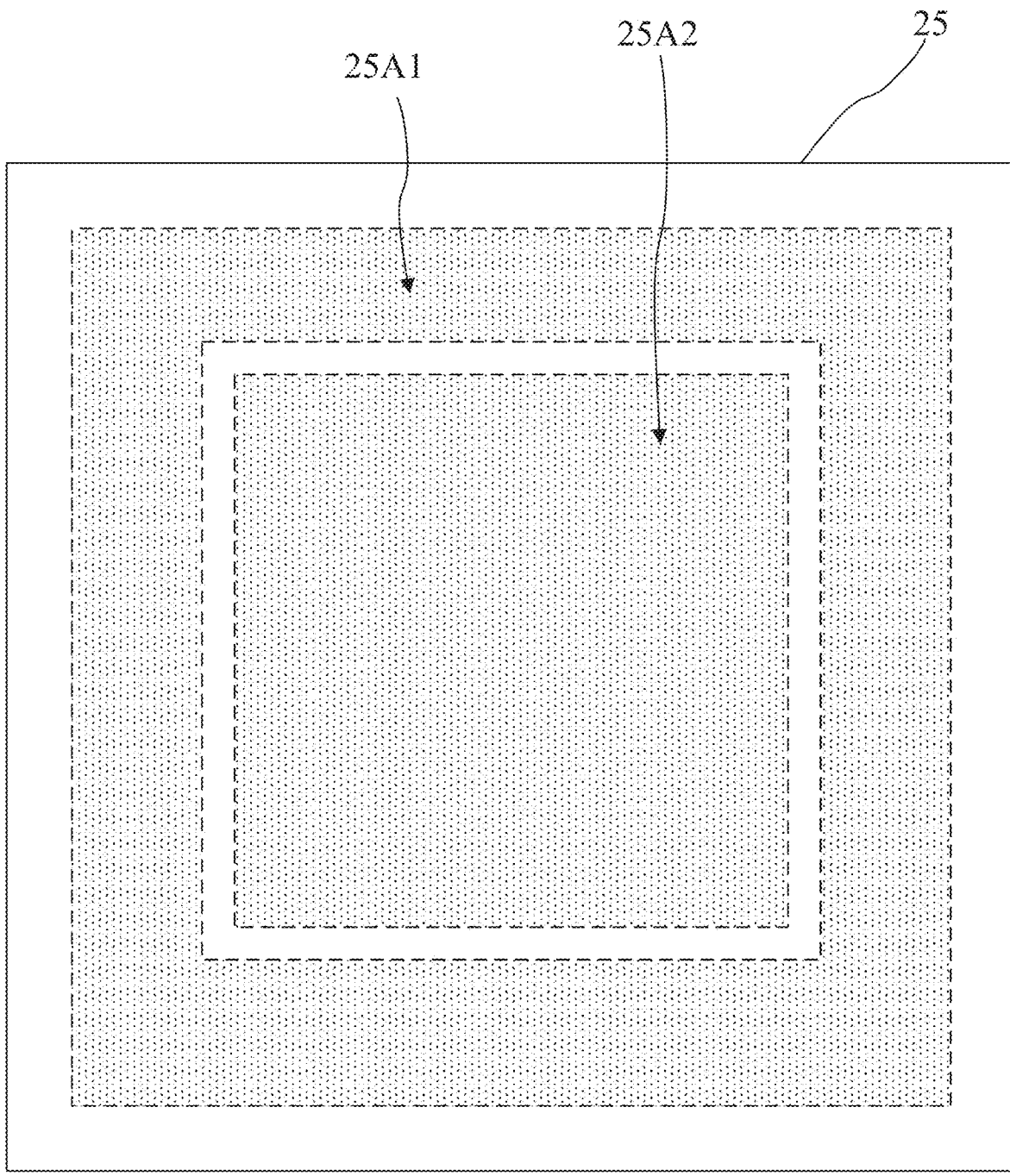
FIG. 2D is a bottom view of a circuit board of a probe device according to some embodiments of the present disclosure.
Figure 2E:
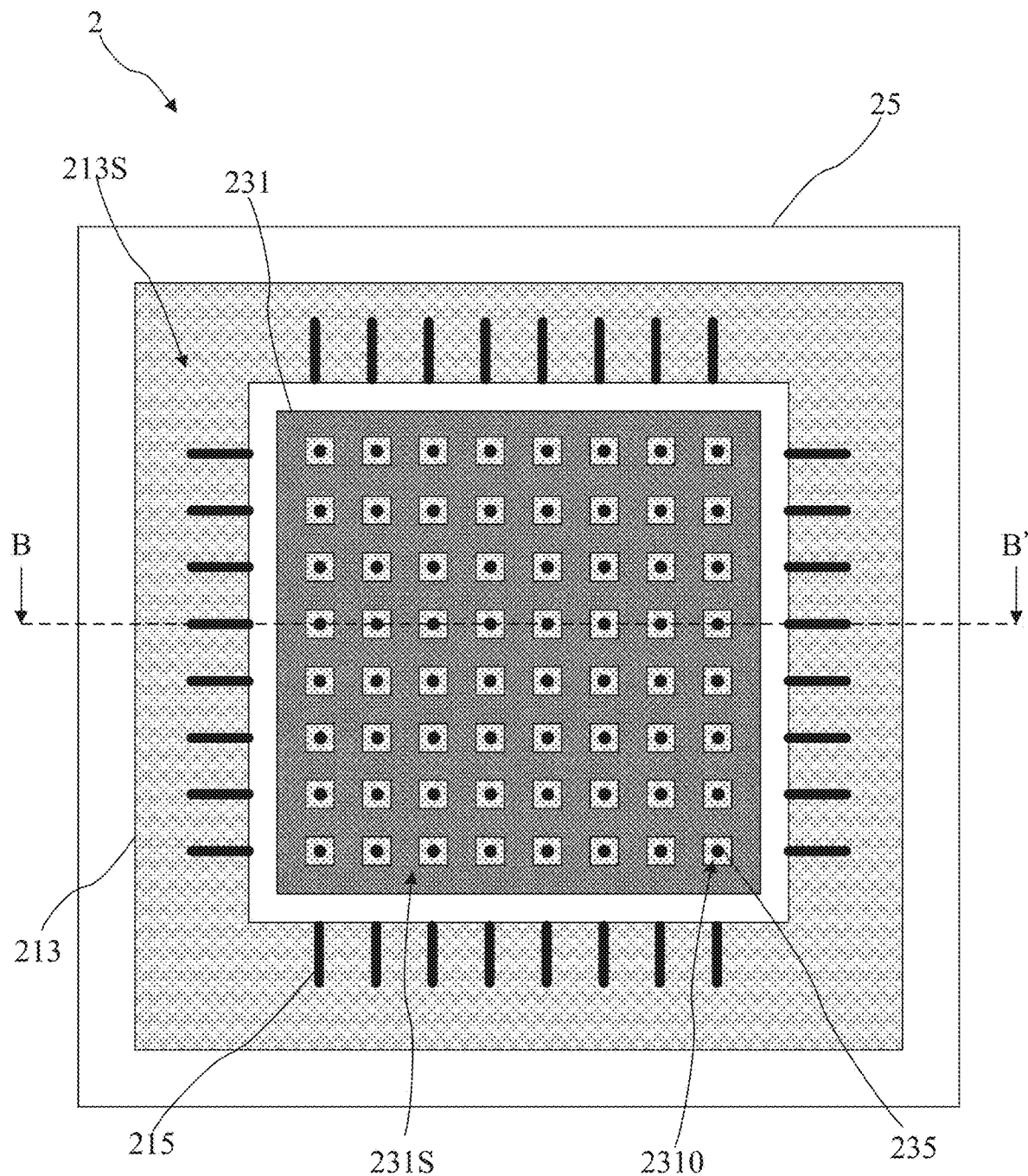
FIG. 2E is a bottom view of a probe device according to some embodiments of the present disclosure.
Figure 2F:
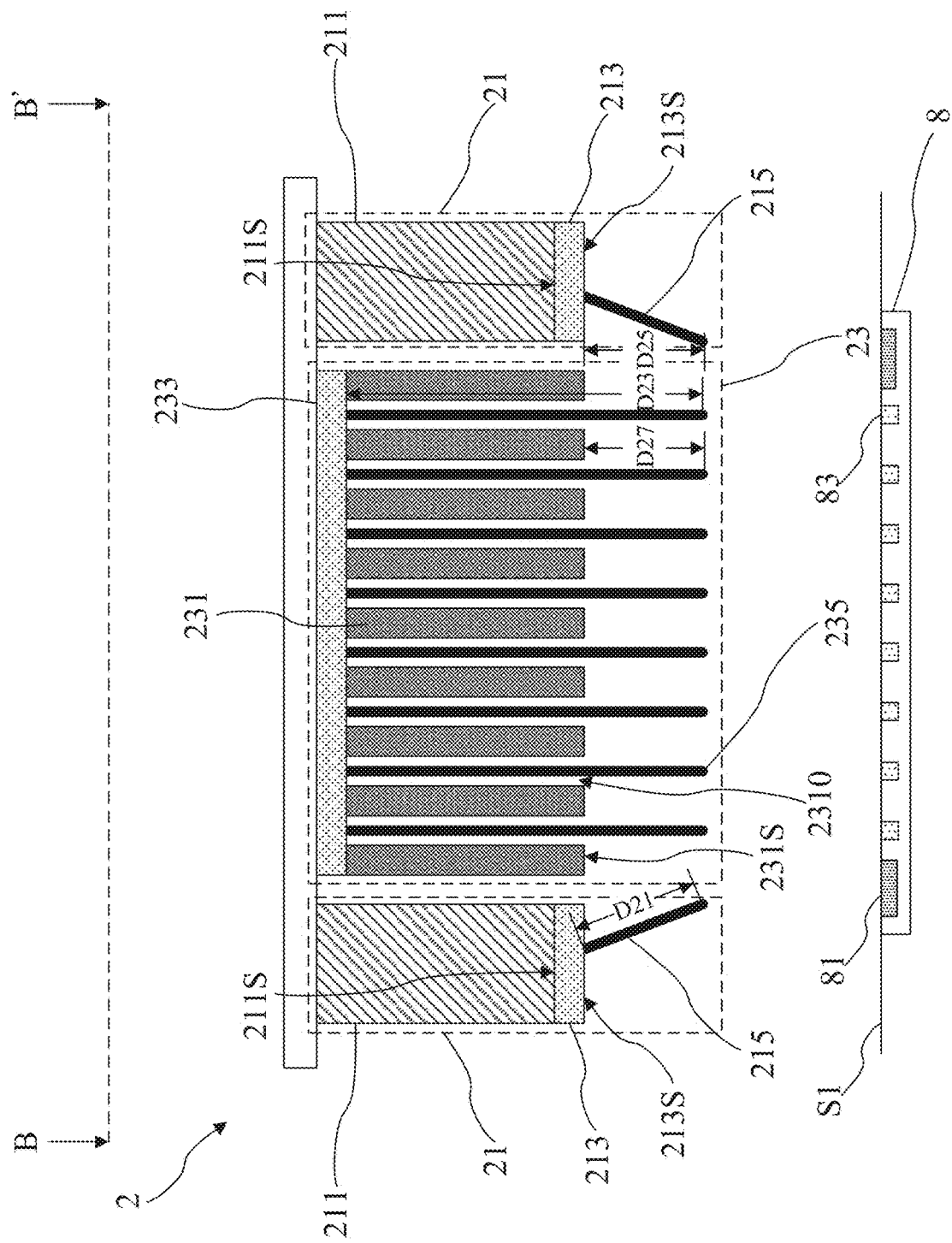
FIG. 2F is a cross-sectional view of a probe device according to some embodiments of the present disclosure.
Figure 2G:
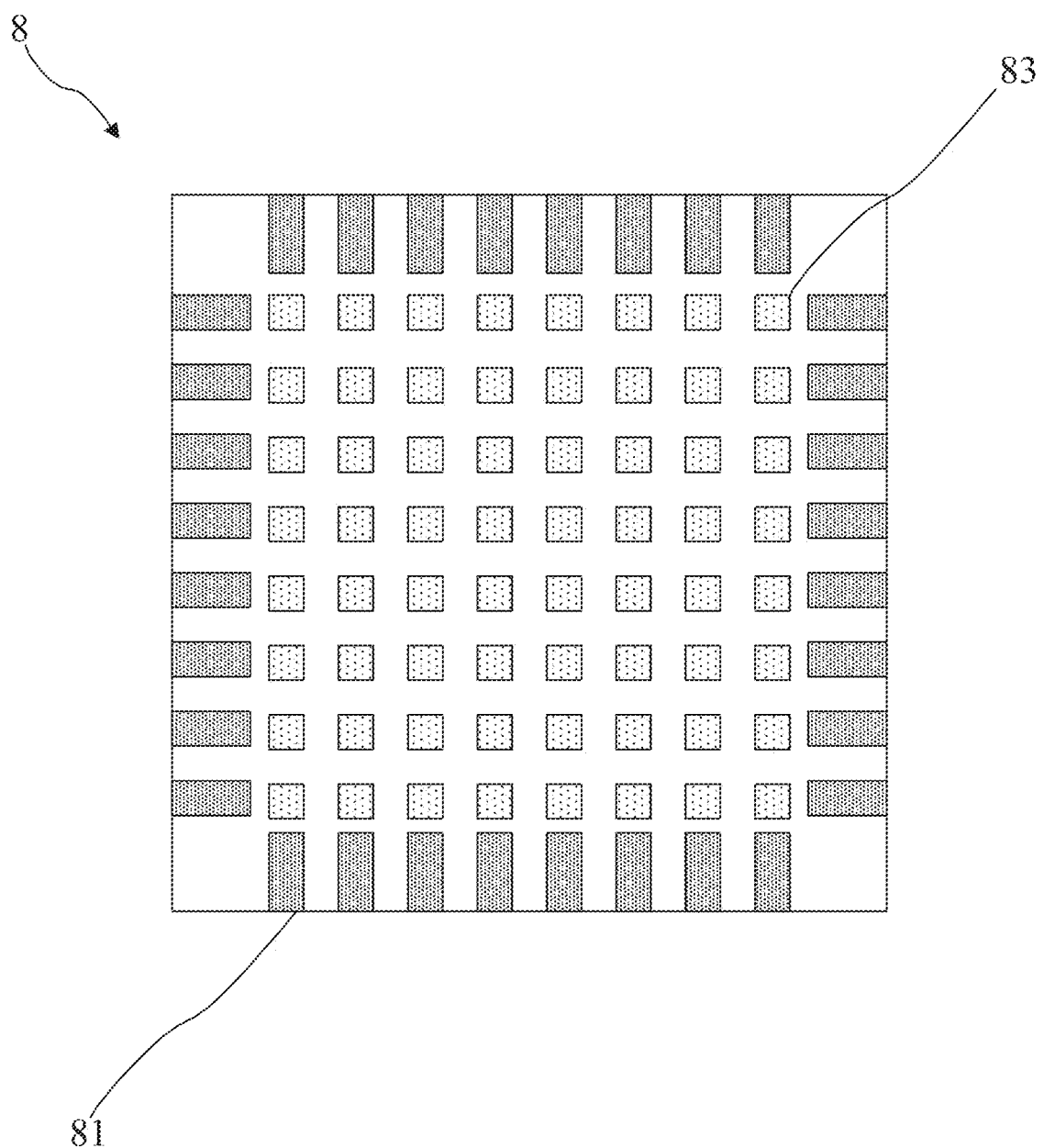
FIG. 2G is a schematic diagram of an object under test corresponding to a probe device according to some embodiments of the present disclosure.

Refer to FIGS. 2A to 2F. FIGS. 2A to 2C show perspective views of a probe device 2 according to some embodiments of the present disclosure. FIG. 2D shows a bottom view of a circuit board 25 of the probe device 2 according to some embodiments of the present disclosure. FIG. 2E shows a bottom view of the probe device 2 according to some embodiments of the present disclosure. FIG. 2F shows a cross-sectional view of the probe device 2 according to some embodiments of the present disclosure. FIG. 2G shows a schematic diagram of an object 8 under test corresponding to the probe device 2 according to some embodiments of the present disclosure. The probe device 2 includes a first probe structure 21, a second probe structure 23 and the circuit board 25. The first probe structure 21 includes a first body 211, a first substrate 213 and a plurality of first probes 215. The second probe structure 23 includes a second body 231, a second substrate 233 and a plurality of second probes 235.

It should be noted that, FIGS. 2A and 2B show the perspective views of the probe device 2 in its entirety. For better understanding, FIG. 2C shows a perspective view of the probe device 2 with the first probe structure 21 removed and the second probe structure 23 remaining.

In some embodiments, the circuit board 25 has a first region 25A1 and a second region 25A2, wherein the first probe structure 21 is disposed in the first region 25A1 and the second probe structure 23 is disposed in the second region 25A2. In some embodiments, as shown in FIG. 2D, the first region 25A1 surrounds the second region 25A2. In other words, the first probe structure 21 is disposed around the second probe structure 23; however, this is not to be construed as a limitation to a configuration form of the probe structures of the present disclosure.

In some embodiments, the object 8 under test has a plurality of first contacts 81 and a plurality of second contacts 83. The plurality of first contacts 81 have a layout on the object 8 under test, and the plurality of second contacts 83 have another layout on the object 8 under test. The plurality of first probes 215 may be disposed on the first substrate 213 based on the layout of the first contacts 81 on the object 8 under test, so that the plurality of first probes 215 are enabled to correspondingly contact with the plurality of first contacts 81. The plurality of second probes 235 may be disposed on the second substrate 233 based on the layout of the second contacts 83 on the object 8 under test, so that the plurality of second probes 235 are enabled to correspondingly contact with the plurality of second contacts 83.

In some embodiments, the first substrate 213 is disposed on the first body 211 and is electrically connected to the circuit board 25, and the plurality of first probes 215 are electrically connected to the first substrate 213 and are electrically connected to the circuit board 25 via the first substrate 213. The second substrate 233 is disposed on the second body 231 and is electrically connected to the circuit board 25, and the plurality of second probes 235 are electrically connected to the second substrate 233 and are electrically connected to the circuit board 25 via the second substrate 233. It should be noted that, in some embodiments, the electrical connections between the substrates 213 and 233 and the circuit board 25 may be implemented by lines (not shown) inside the elements (for example, the bodies, substrates and circuit board).

In some embodiments, in the structure of the first probe structure 21, the first body 211 is between the first substrate 213 and the circuit board 25, and the plurality of first probes 215 protrude outward from a surface 213S of the first substrate 213. More specifically, the first body 211 has a surface 211S facing the object 8 under test, and the first substrate 213 is disposed on the surface 211S of the first body 211. The first probes 215 protrude outward from the surface 213S of the first substrate 213 and are configured to contact with the plurality of first contacts 81 of the object 8 under test.

In some embodiments, in the structure of the second probe structure 23, the second substrate 233 is between the second body 231 and the circuit board 25, and the plurality of second probes 235 protrude outward from a surface 231S of the second body 231. More specifically, the second body 231 has a surface 231S facing the object 8 under test, and the second substrate 233 is disposed on a surface opposite to the surface 231S of the second body 231. The second probes 235 pass through the second body 231 from the second substrate 233, protrude outward from the surface 231S of the second body 231, and are configured to contact with the plurality of second contacts 83 of the object 8 under test.

In some embodiments, as shown in the drawings, corresponding to the plurality of second probes 235 disposed, the second body 231 is provided with a plurality of through holes 2310, so that the plurality of second probes 235 are enabled to pass through the second body 231 from the second substrate 233 via the through holes 2310 and protrude outward from the surface 231S of the second body 231. In some embodiments, the number of the plurality of first probes 215 is less than the number of the plurality of second probes 235.

In some embodiments, a cross-sectional dimension of the through holes 2310 is slightly larger than a cross-sectional dimension of the second probes 235, and with the guidance of the through holes 2310, the second probes 235 are enabled to move within a fixed range. In some embodiments, since the first probe structure 21 is disposed around the second probe structure 23, the plurality of first probes 215 of the first probe structure 21 are naturally disposed around the plurality of the second probes 235 of the second probe structure 23 in terms of structure.

In some embodiments, the plurality of first probes 215 have a same length D21 and the plurality of second probes 235 have a same length D23, wherein the length D21 is different from the length D23. For example, the first probes 215 with a shorter length may be configured to contact with the plurality of first contacts 81 on an outer periphery of the object 8 under test and to test high-frequency signals; the second probes 235 with a longer length may be configured to contact with the plurality of second contacts 83 on an inner part of the object 8 under test and to test digital signals.

In some embodiments, the first probes 215 are configured to contact with one end of the object 8 under test and has a shortest distance D25 from the surface 213S of the first substrate 213, and the second probes 235 are configured to contact with one end of the object 8 under test and has a shortest distance D27 from the surface 231S of the second body 231. In some embodiments, the shortest distance D25 and the shortest distance D27 are substantially equal. Thus, the first probes 215 and the second probes 235 may respectively contact with the plurality of first contacts 81 and the plurality of second contacts 83 of the object 8 under test on a same plane S1.

It should be noted that, in the above embodiments, the substrate (for example, the first substrate 113 or 213, or the second substrate 133 or 233) may include a multi-layer substrate, which may be formed by the same or different elements. For example, the multi-layer substrate may be formed by space transformers, or flexible printed circuit boards; however, these examples are not to be construed as limitations to the implementation forms of the substrate of the present disclosure.

Moreover, in some drawings of the above embodiments, for better understanding of these drawings, only part of the first probes 215, part of the second probes 235, part of the through holes 2310, part of the first contacts 81 and part of the second contacts 83 of the object 8 under test are denoted, and this is not to be construed as interpretation limitations to the elements. Based on the drawings and the description of the present disclosure, a person skilled in the art should be able to understand the configuration of the plurality of the first probes 215 on the first probe structure 21, the configuration of the plurality of second probes 235 on the second probe structure 23, and the configurations of the plurality of first contacts 81 and the plurality of second contacts 83 on the object 8 under test.

In conclusion, the probe device according to the embodiments of the present disclosure is capable of simultaneously coming into contact with different contacts of the same object under test by using different probe structures having probes with different lengths, and respectively testing high-frequency signals and digital signals by using the probes with a shorter length and the probes with a longer length.

The present disclosure and the advantages thereof are described in detail as above. However, it should be understood that various modifications, replacements and substitutions can be made without departing from the spirit and scope of the present disclosure as defined by the appended claims. For example, various processes described above may be implemented by different approaches, and other processes or a combination thereof may be used in substitution for the various processes described above.

Moreover, the scope of the present application is not limited to specific embodiments of the processes, machines, manufacture, substance composition, means, methods or steps provided in the detailed description. A person skilled in the art could understand from disclosure of the present application that existing or future developed processes, machines, manufacture, substance compositions, means, methods or steps that achieve the same functions or achieve substantially the same results corresponding to those of the embodiments described in the disclosure can be utilized. Accordingly, such processes, machines, manufacture, substance compositions, means, methods and steps are to be encompassed within the scope of the appended claims.

What is claimed is:

1. A probe device, comprising:
   a first probe structure, comprising:
   a first body;
   a first substrate, disposed on the first body; and
   a plurality of first probes, electrically connected to the first substrate and protruding from a surface of the first substrate;
   a second probe structure, comprising:
   a second body, having a plurality of through holes;
   a second substrate, disposed on the second body; and
   a plurality of second probes, electrically connected to the second substrate, wherein the plurality of second probes protrude from a surface of the second body via the plurality of through holes, respectively; and
   a circuit board, wherein the first probe structure is disposed in a first region of the circuit board, and the second probe structure is disposed in a second region of the circuit board, wherein the first region surrounds the second region,
   wherein a length of the plurality of first probes is different from a length of the plurality of second probes, and
   wherein the first probe structure is free from having a through hole.

2. The probe device according to claim 1, wherein the first body is between the first substrate and the circuit board, and the second substrate is between the second body and the circuit board.

3. The probe device according to claim 1, wherein the first substrate and the second substrate are respectively electrically connected to the circuit board, the first probes are electrically connected to the circuit board via the first substrate, and the second probes are electrically connected to the circuit board via the second substrate.

4. The probe device according to claim 1, wherein the first substrate comprises a multi-layer substrate, which comprises at least one of a space transformer and a flexible printed circuit board.

5. The probe device according to claim 1, wherein the second substrate comprises a multi-layer substrate, which comprises at least one of a space transformer and a flexible printed circuit board.

6. The probe device according to claim 1, wherein the length of the plurality of first probes is less than the length of the plurality of second probes.

7. The probe device according to claim 1, wherein the first probes are configured to contact with a plurality of first contacts of an object under test to test high-frequency signals, and the second probes are configured to contact with a plurality of second contacts of the object under test to test digital signals.

8. The probe device according to claim 7, wherein the first probes and the second probes respectively contact with the first contacts and the second contacts on a same plane.

9. A probe device, comprising:
   a first probe structure, comprising:
   a first body;
   a first substrate, disposed on the first body; and
   a plurality of first probes, disposed on the first substrate to correspond to a layout of a plurality of first contacts of an object under test, and are configured to test high-frequency signals;
   a second probe structure, comprising:
   a second body, having a plurality of through holes;
   a second substrate, disposed on the second body; and
   a plurality of second probes, disposed on the second substrate via the plurality of through holes of the second body to correspond to a layout of a plurality of second contacts of the object under test, respectively, and are configured to test digital signals; and
   a circuit board, wherein the first probe structure is disposed in a first region of the circuit board, and the second probe structure is disposed in a second region of the circuit board, wherein the first region surrounds the second region,
   wherein the first probe structure is free from having a through hole.

* * * * *